United States Patent [19]

Sassa et al.

[11] Patent Number: 5,213,882

[45] Date of Patent: May 25, 1993

[54] STATIC DISSIPATIVE NONWOVEN TEXTILE MATERIAL

[75] Inventors: Robert Sassa, Newark, Del.; Richard Winkelmayer, Jr., North East, Md.

[73] Assignee: W. L. Gore & Associates, Inc., Newark, Del.

[21] Appl. No.: 809,891

[22] Filed: Dec. 18, 1991

[51] Int. Cl.$^5$ .................. D04H 1/08; D04H 1/58; B01D 39/10; B32B 27/00

[52] U.S. Cl. .................. 428/224; 428/280; 428/288; 428/922; 428/36.1; 55/9; 210/243; 210/499

[58] Field of Search .............. 428/225, 224, 280, 288, 428/421, 422, 922; 55/9; 210/243, 499

[56] References Cited

U.S. PATENT DOCUMENTS

| | | | |
|---|---|---|---|
| 2,893,105 | 7/1959 | Lauterbach | 428/72.2 |
| 4,983,434 | 1/1991 | Sassa | 428/36.2 |
| 4,985,296 | 1/1991 | Mortimer, Jr. | 428/422 |

OTHER PUBLICATIONS

Kirk-Othmer Encyclopedia of Chemical Technology, CDROM Edition, Chapter: Antistatic Agents, Section Antistatic Agents for Textile Materials, John Wiley & Sons, Inc. (1990).

*Primary Examiner*—George F. Lesmes
*Assistant Examiner*—Kathryne E. Shelborne
*Attorney, Agent, or Firm*—Gary A. Samuels

[57] ABSTRACT

A nonwoven textile material useful in dissipating static electric charges containing an electrically conductive polytetrafluoroethylene fiber. An amount of a synthetic fiber may be intermixed with the electrically conductive polytetrafluoroethylene fiber to produce the static dissipative textile material. The nonwoven static dissipative textile material may combine with a porous polymeric membrane to form nonwoven fabric laminate.

The nonwoven textile material is useful as a filtration media and may be fabricated into a filter bag.

7 Claims, 2 Drawing Sheets

STATIC DISSIPATIVE NONWOVEN TEXTILE MATERIAL

FIELD OF THE INVENTION

This invention relates to a nonwoven textile material containing electrically conductive polytetrafluoroethylene fibers. The nonwoven textile material may be in the form of a felt and is useful in dissipating static electric charges. The nonwoven textile material may be combined with a porous polymeric membrane to form a laminate.

BACKGROUND OF THE INVENTION

Control of static electricity can be of great importance in many industrial settings where an uncontrolled electrostatic discharge (ESD) or spark can result in serious damage. For example, static discharges can bring about the destruction of integrated circuits during some stages of their manufacture. In explosive environments such as in grain elevators or in flammable environments such as on oil drilling rigs, in refineries and in solvent-based processes, a static discharge can be extremely dangerous and must be prevented in order to safeguard life and property.

Organic polymeric textile materials used in these settings can be the source of static discharges due to the normally insulative nature of the materials and have a high value of specific resistance, typically on the order of $10^{16}$ ohm cm, unless the materials are altered to prevent build up of electrical charges on their surfaces by permitting charges found on their surfaces to drain in a controlled manner. To control static electrical charges found in textile materials, electrical conductivity of organic polymeric textile material may be increased through application of antistatic finishes to the textile material or through introduction of fibers, which have a degree of electrical conductivity, into the textile material. Other means for controlling static electric charges include such external devices as grounding straps or wires to carry electrical charges found on the textile material to ground.

Antistatic finishes are commonly applied to organic polymeric textile materials either when the organic polymeric textile material is in fiber form or in fabric form. These finishes typically increase ionic conductivity of the surface on which they are applied thereby promoting static dissipation. However, these finishes are typically not as durable as the polymeric textile materials on which they are applied. Use and cleansing of the organic polymeric textile material can remove these finishes from the fabric surface thereby resulting in a loss of the organic polymeric textile material's ability to dissipate static electric charges found on their surfaces.

Coatings of metals or of conductive carbon may be added to the outside surface of fibers used in producing organic polymeric textile material. However, if the coating used is not as flexible as the fiber on which it is placed, flexing of the fiber while in use may cause cracking in the coating and therefor interruptions in the conductive pathway formed by the coating with a resulting loss of conductivity in the organic polymeric textile material.

Introduction of fibers produced of materials that have a degree of electrical conductivity into the organic polymeric textile material allows a more durable method of altering the surface conductivity of the material. Certain types of carbon and metal fibers are inherently conductive, and incorporation of these fibers even at a small percentage of the total fiber content of the textile material into anorganic polymeric textile material can increase the conductivity of the textile material to the extent that a previously static-prone material can be rendered static dissipative.

However, use of these fibers presents additional problems. Carbon fibers are relatively brittle when compared to the majority of fibers presently in use and exhibit the tendency to break when flexed. If the textile material is used in a high efficiency particle filter in a clean environment, breakage of carbon fibers results in a reduction in the static dissipative capabilities of the organic polymeric textile material as well as providing a source of contamination to the environment which is known as media migration. This contamination can be especially burdensome if the organic polymeric textile material is being used in a clean room for the production of integrated circuits or for the assembly of highly critical optical parts.

Use of metal fibers, usually stainless steel, also presents problems. If the textile material is incorporated into a filter structure, metal fibers may be lost through media migration from the textile material and contaminate the collected product and/or the filtered stream. This would pose a significant downstream problem to such industries as food processors, pharmaceutical manufactures and chemical producers.

Metal fibers also present a problem for those who process textile materials. Processors typically utilize metal detectors in their equipment to detect the presence of stray pieces of metal commonly known in the art as "tramp metal". These stra pieces of metal if undetected can result in a flawed textile material as well as posing a hazard to equipment and personnel that would subsequently come in contact with the textile material. Use of metal fibers precludes the use of these detectors when producing an organic polymeric textile material containing these metal fibers.

Organic polymeric fibers commonly used to produce organic polymeric textile materials, such as polyamides and polyesters, have had conductive material incorporated into their structures to impart a degree of conductivity to these materials. The conductive material may be found in a stripe of conductive material on the outside of the fiber, a conductive core of material found in the fiber or an amount of conductive material dispersed throughout the fiber's structure. However, these materials have a relatively limited usable range with respect to the temperatures and chemical exposures these materials can withstand without degrading. In certain areas where organic polymeric textile materials are used for example as filter media, the need for chemical and temperature resistance is great, and the need for a flexible, electrically stable, static dissipative textile material is critical.

Polytetrafluoroethylene (PTFE) is an organic polymeric material that is highly resistant to many corrosive chemicals and remains stable over a wide range of temperatures. PTFE, and especially a particular high strength form of PTFE, expanded porous polytetrafluoroethylene, (ePTFE), has demonstrated utility as an organic polymeric textile material for use in demanding environments. However, ePTFE is also an excellent insulator and is commonly used as an insulating layer in electronic cable constructions.

Static dissipative textile materials that are highly resistant to corrosive attack while remaining electrically stable and flexible over a wide range of temperatures is the object of the present invention.

BRIEF DESCRIPTION OF THE INVENTION

A static dissipative nonwoven textile material comprising an o electrically conductive polytetrafluoroethylene fiber wherein said static dissipative nonwoven textile material has a static dissipation time of 0.5 seconds or less is disclosed. The static dissipative textile material is in the form of a nonwoven fabric, such as a felt. An amount of a synthetic fiber may be intermixed with the electrically conductive polytetrafluoroethylene fiber.

The static dissipative nonwoven textile material may be combined with a porous polymeric membrane to produce a nonwoven textile laminate. The nonwoven textile laminate is static dissipative when tested. The static dissipative nonwoven textile material and the nonwoven textile laminate have utility as filter media and may be fabricated into filter bags or filter cloths.

DETAILED DESCRIPTION OF THE INVENTION

Figure 1:
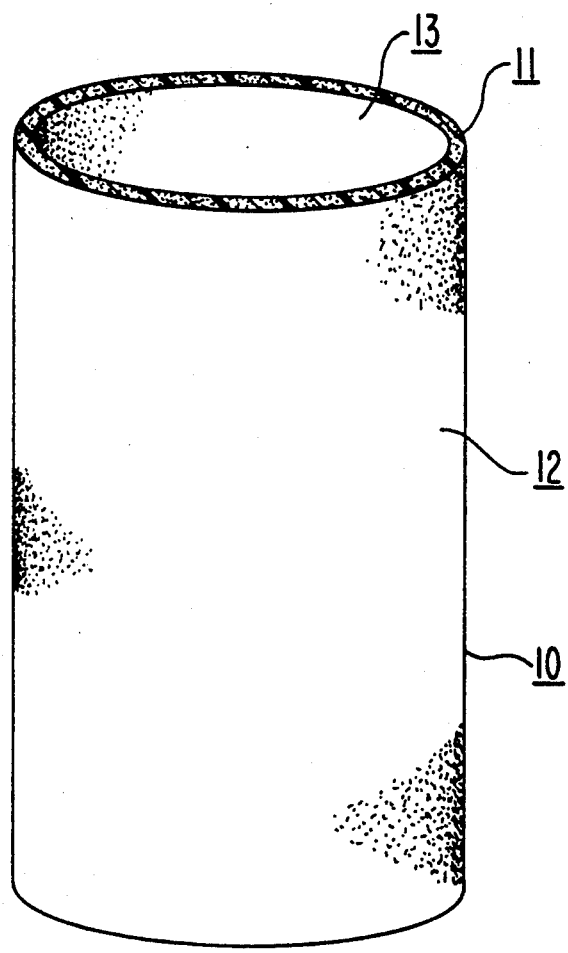
FIG. 1 is a perspective view of the inventive static dissipative nonwoven textile material in the form of a filter bag.

A static dissipative nonwoven textile material of the instant invention comprising an electrically conductive PTFE fiber, preferably an electrically conductive ePTFE fiber. The ePTFE fiber, which normally is nonconductive, is rendered conductive through the incorporation of a particulate filler within the fiber. The term "fiber" is defined herein as to include any slender filament and thus includes continuous monofilament, tow, staple and flock. A conductive ePTFE fiber is produced from an ePTFE matrix in film form in which an amount of a conductive particulate is contained.

The ePTFE matrix in film form is produced in the following manner:

A fine powder PTFE resin is combined with a conductive particulate through one of two methods. The conductive particulate having utility in the electrically conductive ePTFE fiber may be selected from a group consisting of metals, metal oxides, graphites or carbon blacks. By "particulate" is meant individual particles of any aspect ratio and thus includes flock, flakes and powders.

It is preferable to combine fine powder PTFE resin with the mineral spirit prior to the addition of the conductive particulate to the blender in order to obtain a consistent mixture of the fine powder PTFE resin and the conductive particulate. In another method, an aqueous dispersion PTFE resin is obtained. Into the aqueous dispersion, a conductive particulate is added. The mixture is co-coagulated by rapid shearing of the aqueous dispersion, or through destabilization of the aqueous dispersion with salt, acid, polyethylene imine or the like. A coagulum of fine powder PTFE resin and conductive particulate is subsequently formed and dried into cakes. When dry, the cakes are carefully crumbled and lubricated with a mineral spirit and blended forming a compound.

The compound produced by either of the previously described methods is compressed into a billet and subsequently extruded through a die by a ram-type extruder forming a coherent extrudate. The mineral spirit functions as an extrusion lubricant for the compound.

The coherent extrudate is compressed between a pair of calender rollers to reduce its thickness. Subsequently, the mineral spirit is removed from the calendered coherent extrudate by passing the coherent extrudate over a series of heated rollers. The heated rollers are heated to a temperature at or above the boiling point of the mineral spirit present in the coherent extrudate thereby volatilizing the mineral spirit leaving a dry coherent calendered extrudate.

The dry coherent calendered extrudate is stretched using the method of expanding PTFE taught in U.S. Pat. No. 3,543,566 to Gore incorporated herein by reference. The dry coherent calendered extrudate is initially rapidly stretched uniaxially in a longitudinal direction $1.2\times$ to $5000\times$, preferably $2\times$ to $100\times$ its starting length, at a stretch rate over 10% per second at a temperature of between 35° C. and 327° C. An expanded porous polytetrafluoroethylene (ePTFE) matrix in continuous film form in which is distributed a conductive particulate fiber is produced.

The ePTFE matrix in continuous film form may be slit to a desired width by a means for slitting films to form a continuous slit film fiber having a substantially rectangular profile. The continuous slit film fiber is subsequently stretched uniaxially in a longitudinal direction up to fifty (50) times its length by the method taught in Gore, previously referenced herein. The second stretching step increases the strength of the resultant fiber producing an expanded continuous slit film fiber. The increase in strength of the expanded continuous slit film fiber is a result of increased orientation of the ePTFE matrix. For any specific conductive particulate filler, the amount of stretching to which the continuous slit film fiber may be subjected is dependent on the percentage of particulate filler present in the fiber. The greater the percentage of particulate filler, the less the continuous slit film fiber may be stretched.

The expanded continuous slit film fiber may subsequently be subjected to a temperature in excess of 342° C. in order to perform an amorphous locking step as taught in Gore specifically on column 3, lines 49-65. If fully restrained longitudinally, the amorphous locking step further increases the strength and density of the expanded continuous slit film fiber.

Alternatively, prior to slitting, the ePTFE matrix in continuous film form may be compressed and densified by a means for compressing, such as a pair of adjacent nip rollers, to reduce the thickness of the ePTFE matrix in continuous film form, as taught in U.S. Pat. No. 4,985,296 to Mortimer, Jr. incorporated herein by reference. Compression and densification increases contact between individual conductive particulate filler particles thereby increasing conductivity of the ePTFE matrix in continuous film form producing a thin ePTFE matrix in continuous film form. To increase the strength of the thin ePTFE matrix in continuous film form, multiple layers of the coherent extrudate are stacked longitudinally and calendered upon one another forming a layered article. The layered article is subsequently dried, expanded and densified to produce a thin ePTFE matrix of greater strength when compared to an analogous thin ePTFE matrix produced from a single layer of ePTFE matrix.

The thin ePTFE matrix may be subjected to the amorphous locking step previously described. The thin ePTFE matrix in continuous film form may be slit to a desired width by a means for slitting films to form a thin continuous fiber having a substantially rectangular profile.

The electrically conductive ePTFE fiber exhibit relatively high bulk tensile strengths with relatively low volume resistivities. Conductive particulate filler distributed in the does not contribute to the fiber's strength. Rather, strength of the fiber is as a result of the amount of PTFE present and the strength of that PTFE. However, the formation of an ePTFE matrix, while increasing the strength of the matrix, also reduces its density and, therefore, increases its volume resistivity.

Expansion of the ePTFE matrix for increased bulk tensile strength and subsequent densification of the ePTFE matrix for decreased volume resistivity permits one to tailor the properties of the electrically conductive ePTFE fiber.

It is possible to increase the conductivity of the fiber by increasing the density of the fiber. The density of the fiber may be increased through compression. Compression of the fiber may be accomplished by passing the fiber through a means for compressing such as, for example, a pair of nipped rollers.

The density of the fiber may also be increased by subjecting the fiber to the previously described amorphous locking step which causes a degree of shrinkage in the fiber. Densification of the fiber through the amorphous locking step is preferable when the profile of the continuous fiber is to be maintained rather than altered through a compression step.

Electrically conductive ePTFE fibers may have a range of volume resistivities. A fiber with a volume resistivity of $10^{12}$ ohms cm or less, as determined by the method described in ASTM D257-90, is defined herein as "electrically conductive" and has utility in providing articles of manufacture with ESD control capabilities. The lower value of volume resistivity is not critical and is limited by the conductive particulate used.

The electrically conductive ePTFE fiber may be subsequently formed into a tow. The tow is formed by hackling the continuous monofilament fiber forming a fibrous tow web. This fibrous tow web is subsequently chopped into short lengths thereby producing a staple comprising a matrix of ePTFE in which a conductive particulate filler is distributed. Chopping the staple into shorter lengths produces a flock.

The electrically conductive PTFE fiber may be formed into the static dissipative nonwoven textile material or may be intermixed with an amount of a synthetic fiber to form the inventive textile material. The term "synthetic" is defined herein to mean an article of non-natural origin. The synthetic fiber may be in any form of fiber. The synthetic fiber may be either inorganic or organic in nature.

Inorganic synthetic fibers may be selected from the group consisting of glass and ceramic. Organic synthetic fibers may be selected from the group consisting of polyester, polyamide, polyphenylene sulfide, polypropylene, polyethylene, polyether ether ketone, polyimide, polyacrylonitrile, polyketone, copolyimide and polyaramid. The organic synthetic fiber may be a fluorocarbon. Fluorocarbons of use in the instant invention may be selected from the group consisting of copolymers of tetrafluoroethylene and perfluoropropyl vinyl ether, fluorinated ethylene propylene copolymer, ethylene chlorotrifluoroethylene, ethylene trifluoroethylene, polyvinyl difluoride, polytetrafluoroethylene (PTFE). Preferably the fluorocarbon is expanded porous polytetrafluoroethylene (ePTFE) described in U.S. Pat. No. 4,187,390 to Gore, incorporated herein by reference.

The intermixing of the electrically conductive PTFE fiber and the synthetic fiber may be accomplished through mechanical interlocking, fusing, bonding, or felting process thereby forming the inventive textile material in nonwoven form. Preferably, the inventive textile material is in a felt form.

The production of felt from PTFE fibers is generally described in U.S. Pat. No. 2,893,105 to Lauterbach and is accomplished through a needle punching process, incorporated herein by reference.

The synthetic fiber and the electrically conductive PTFE fiber are preferably intermixed to form the inventive textile material at a percentage of the electrically conductive PTFE fiber to the synthetic fiber of between 1% and 10% by weight, more preferably between 2% and 5% by weight.

Referring now to FIG. 1, the inventive textile material 11 is in the form of a filter bag 10. The filter bag 10 has an outside surface 12 and an inside surface 13 and is useful for filtering material from fluid streams. The inventive textile material may also be in the form of a cloth.

The inventive textile material may be combined with a porous polymeric membrane to produce a nonwoven textile laminate. The nonwoven textile laminate is static dissipative when tested by the test method disclosed herein. The porous polymeric membrane may be selected from the group consisting of nitrocellulose, triacetyl cellulose, polyamide, polyurethane, polycarbonate, polyethylene, polypropylene, polytetrafluoroethylene, polysulfone, polyvinyl chloride, polyvinylidine fluoride, acrylate copolymer and methacrylate copolymer. The porous polymeric membrane is preferably expanded porous polytetrafluoroethylene membranes. The porous polytetrafluoroethylene membrane used is prepared expanding polytetrafluoroethylene as described in U.S. Pat. No. 3,953,566, to obtain expanded, porous polytetrafluoroethylene. By "porous" is meant that the polymeric membrane has an air permeability of at least 0.0002 m/min @20 mm water gauge. Air permeabilities of 146.3 m/min @20 mm water gauge or more can be used. The membrane may preferably have an air permeability of at least 7.8 m/min @20 mm water gauge, for use in gas stream filtration. Lower air permeability membranes are useful in liquid stream applications.

The production of felt from ePTFE fibers as well as the formation of fabric laminates from felt is taught in U.S. Pat. No. 4,983,434 to Sassa. incorporated herein by reference.

Figure 2:
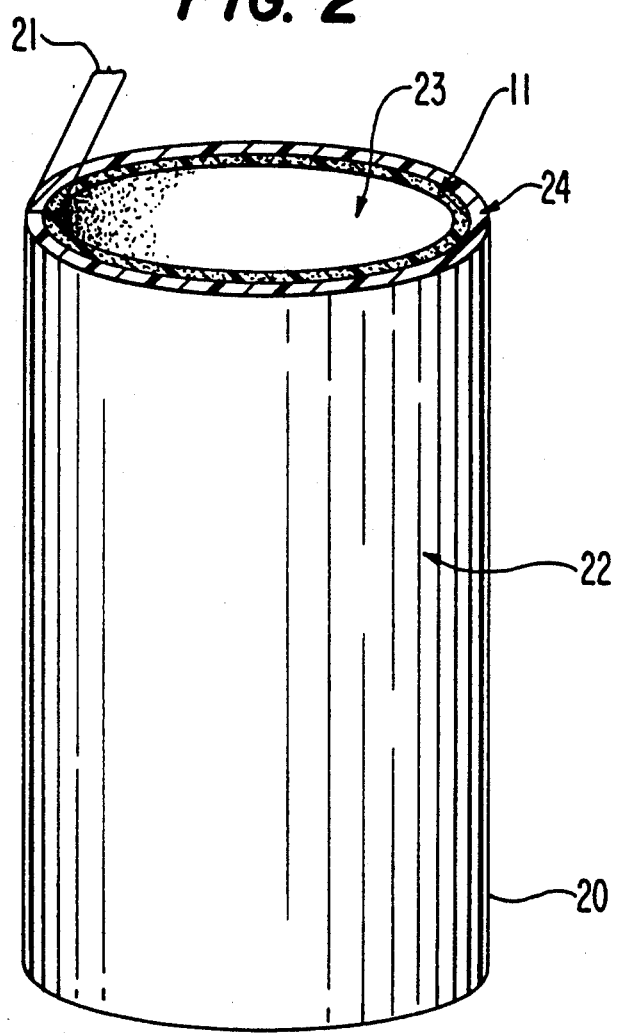
FIG. 2 is a perspective view of the inventive nonwoven textile laminate in the form of a filter bag.

Referring now to FIG. 2, the nonwoven textile laminate 21 is in the form of a filter bag 20. The filter bag 20 has an outside 22 and an inside 23. The static dissipative nonwoven textile material 11 is depicted on the inside 23 and the porous polymeric membrane 24 is depicted on the outside 22. Arrangement of the static dissipative nonwoven textile material 11 and the porous polymeric membrane 24 may be reversed if required. The filter bag 20 is useful for filtering material from fluid streams. The nonwoven textile laminate 21 may also be in the form of a cloth.

TEST METHODS

Static Decay Test

To determine if a sample is "static dissipative", its static decay property is determined. The test used is the National Fire Protection Agency (NFPA) Code 99 Chapter 3 "Static Decay Test" Samples are conditioned at 21° C., 40% relative humidity. The static decay time of the samples are measured by charging the sample to 5000 volts and then timing its discharge to 500 volts. A material that has a static decay time below 0.5 seconds is considered static dissipative.

VOLUME RESISTIVITY

The volume resistivity of the fibers are determined using the method described in ASTM D257-90, "Standard Test Methods for D-C Resistance or conductance of Insulating Material".

The following example is presented to further explain the teachings of the instant invention and not to limit the scope of the invention. Various modifications and equivalents will readily suggest themselves to those of ordinary skill in the art without departing from the spirit and scope of the instant invention.

EXAMPLE

A felt of the present invention was produced in the following manner.

An electrically conductive ePTFE fiber was produced from a conductive tape of ePTFE produced from a dry mixture of 20% by weight conductive carbon black (Vulcan XC-72R available from Cabot Corporation, Boston Mass.) and 80% by weight fine powder PTFE resin. The tape was slit along its length into two parts, expanded, and processed over a rotating pinwheel to form a tow yarn. The tow yarn was then chopped to 11 cm length staple fiber.

A similar staple was also produced from a synthetic fiber of expanded porous PTFE.

The electrically conductive ePTFE fiber and the synthetic fiber of expanded porous PTFE were opened on conventional carding equipment and then collected in boxes for additional processing.

A blend of the two staple fibers was produced by hand mixing 5% by weight electrically conductive ePTFE fiber and 95% by weight synthetic fiber.

A woven scrim was used made of 440 decitex ePTFE weaving fiber,(Rastex® fiber, available from W. L.Gore and Associates, Inc., Elkton, Md.) The scrim was constructed with a thread count of 16×8 threads/cm resulting in a weight of approximately 130 g/m2.

The blended staple fibers were fed into conventional carding equipment. The carded web was crosslapped onto the scrim and tacked together by a needle loom. A web was then crosslapped onto the other side of the scrim and needled again. The felt was needle punched several times to interlock the staple fibers to the scrim sufficiently. This product was then heat set while being restrained in the cross machine direction for several minutes to improve it's thermal stability. The final felt had a weight of 600 g/m², an air permeability of 17 m/min @20 mm water gauge, and a thickness of 0.80 mm.

The needled felt was coated with an fluorinated ethylene propylene copolymer (FEP) aqueous dispersion (T-120 available from E.I.duPont de Nemours and Co). The felt was then dried in loop dryer oven at 200° C. with a dwell time of 8 minutes. The dried FEP aqueous dispersion add on was 3.5% by weight.

A layer of porous expanded PTFE membrane with an air permeability of 8.8 m/min @20 mm water gauge was laminated to the coated side of the felt. The felt was subjected to sufficient heat, pressure, and dwell time to soften the dried FEP aqueous dispersion. The resulting fabric laminate had good bond strength between the porous expanded PTFE membrane and the felt, and an air permeability of 2.8 m/min @20 mm water gauge with excellent filtration efficiency of solid particulates.

The inventive nonwoven fabric laminate was tested to determine its static decay properties. The fabric laminate was determined to be static dissipative since it had a static decay time of less than or equal to 0.01 seconds.

We claim:

1. A static dissipative nonwoven textile material comprising an electrically conductive polytetrafluoroethylene fiber intermixed with at least one other synthetic organic fluorocarbon fiber, wherein the static dissipative nonwoven textile material has a static dissipation time of 0.5 seconds or less.

2. A static dissipative nonwoven textile material as described in claim 1 wherein the static dissipative textile material is in felt form.

3. A static dissipative textile material as described in claim 1 wherein the fluorocarbon is selected from the group consisting of copolymers of tetrafluoroethylene and perfluoropropyl vinyl ether, fluorinated ethylene propylene copolymer, ethylene chlorotrifluoroethylene, ethylene trifluoroethylene, polyvinyl difluoride and polytetrafluoroethylene.

4. A static dissipative textile material as described in claim 1 wherein the fluorocarbon fiber is expanded porous polytetrafluoroethylene.

5. A static dissipative textile material as described in claim 1 wherein the electrically conductive polytetrafluoroethylene fiber is conductive expanded porous polytetrafluoroethylene.

6. A static dissipative nonwoven textile material as described in claim 1 in the form of a filter bag.

7. A static dissipative nonwoven textile material as described in claim 1 in the form of a filter cloth.

* * * * *